United States Patent [19]
Hornbeck

[11] 3,918,190
[45] Nov. 11, 1975

[54] METHOD FOR ILLUMINATING ORGANIC FISHING BAITS

[76] Inventor: Eugene K. Hornbeck, 2709 Anderson Drive, Lincoln, Nebr. 68506

[22] Filed: Nov. 11, 1974

[21] Appl. No.: 522,597

Related U.S. Application Data

[63] Continuation-in-part of Ser. No. 464,812, April 29, 1974, abandoned.

[52] U.S. Cl. .................... 43/4.5; 43/17.6; 43/42.53
[51] Int. Cl.² ......................................... A01K 85/00
[58] Field of Search ............ 43/1, 4, 4.5, 17.5, 17.6, 43/42, 42.33, 42.32, 42.53; 119/1; 426/1

[56] References Cited
UNITED STATES PATENTS

| | | | |
|---|---|---|---|
| 1,422,841 | 7/1922 | Dey | 43/17.6 |
| 3,526,988 | 9/1970 | Young | 43/4 |
| 3,545,404 | 12/1970 | Loftus | 119/1 |
| 3,576,987 | 5/1971 | Voight | 43/17.6 |
| 3,708,903 | 1/1973 | Bercz et al. | 43/42.33 |
| 3,762,092 | 10/1973 | Bercz et al. | 43/17.6 |

Primary Examiner—Warner H. Camp
Attorney, Agent, or Firm—George R. Nimmer

[57] ABSTRACT

The internal tract of organic fishing baits such as angleworms, nightcrawlers, crayfish, or other suitable physiological creatures, is injected with a liquid chemiluminescent light source for the purpose of enhancing attraction of game fish toward the bait. The chemiluminescent light source is of long-term extended continuous time-duration and is chemically generated by the slow continuing inter-reaction within the fishing bait of at least two normally stable chemical components including a first-component and a second-component. The dispensing device therefor includes a manually resiliently compressible container for the liquid chemiluminescent light source and communicating with a sharp needle-like snout for injecting said chemiluminescent light into the organic bait. Preferred dispensing devices include a manually pressurable rupturable segregation means within the container for mutually isolating the first-component and second-component where they are indefinitely maintainable in "ready" non-chemiluminescent condition until they are purposely desegregated into admixture for inter-reaction to commence the long-term chemiluminescent time-duration.

4 Claims, 18 Drawing Figures

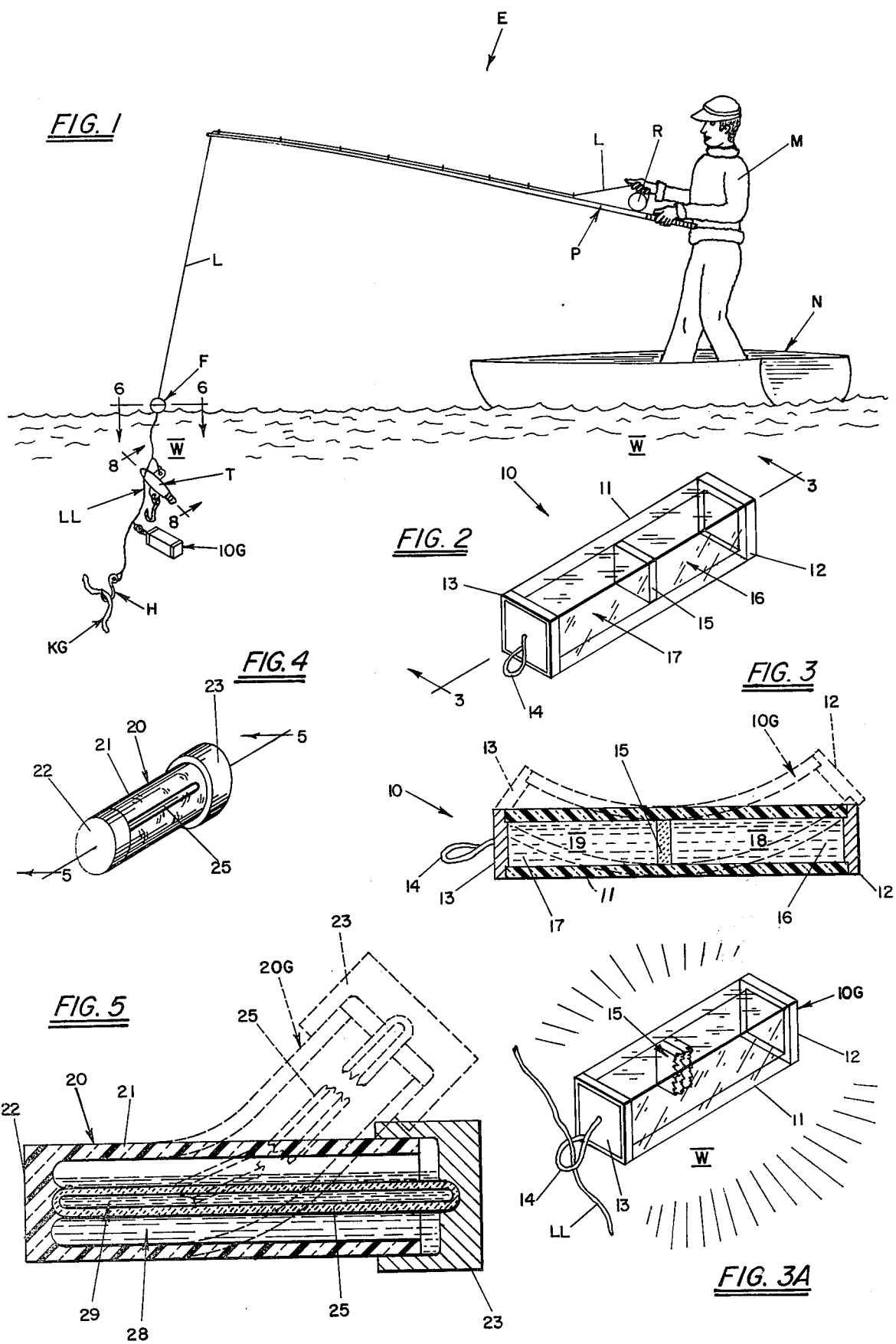

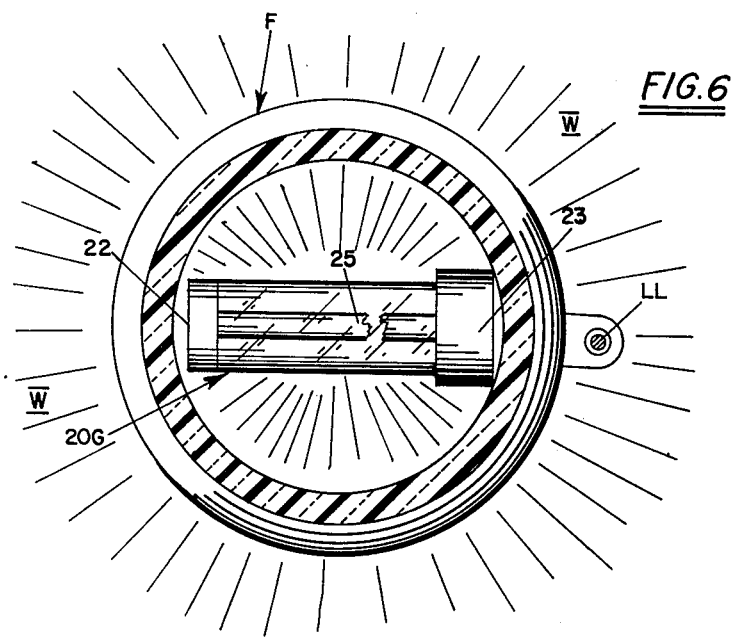
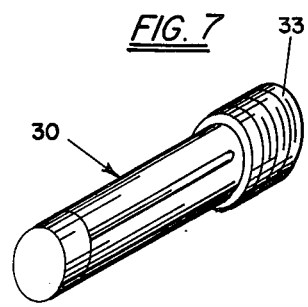
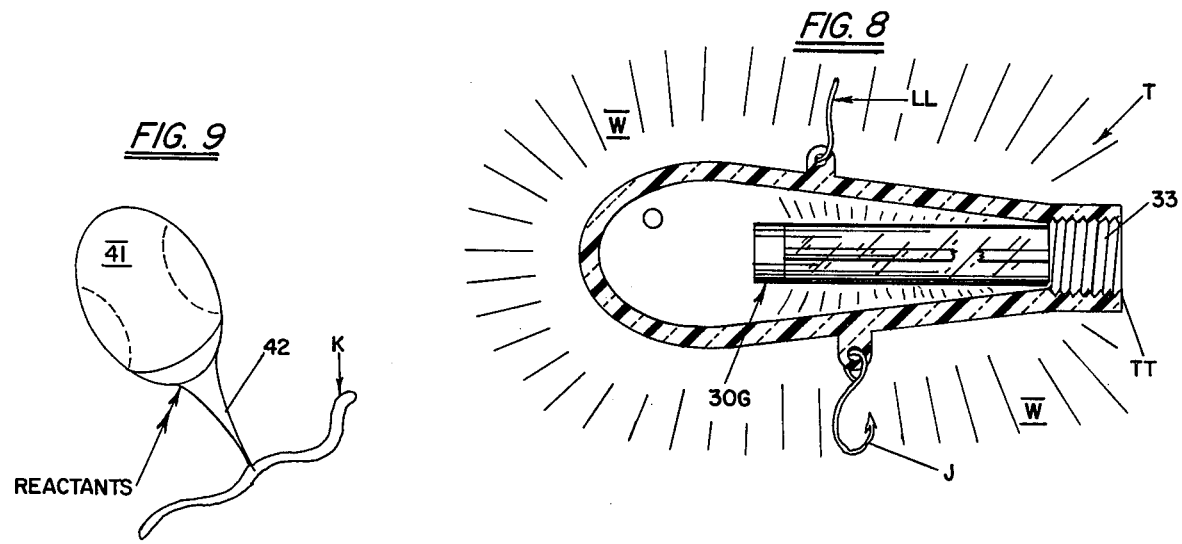
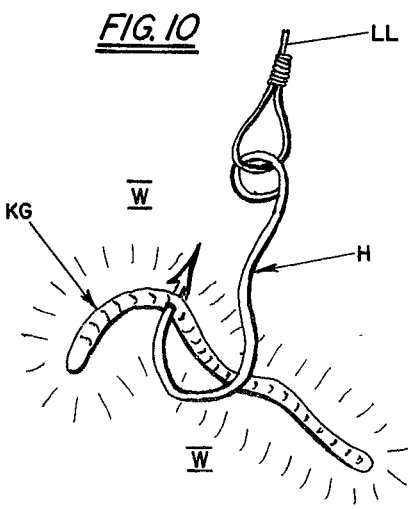

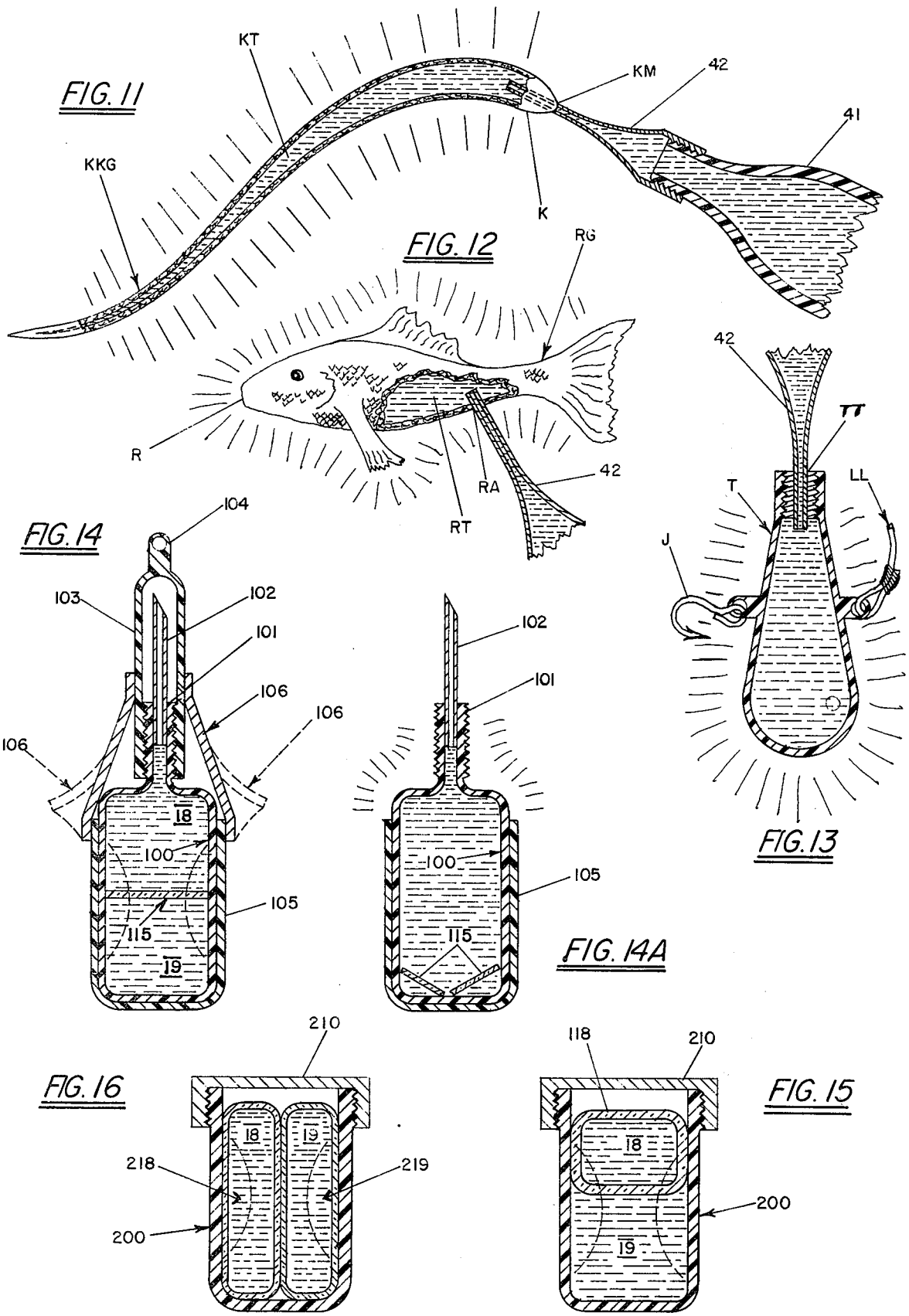

METHOD FOR ILLUMINATING ORGANIC FISHING BAITS

This is a continuation-in-part of application Ser. No. 464,812 (filed Apr. 29, 1974) and now abandoned.

The leadward length portion of fishinglines is customarily cast or otherwise positioned within the aquatic medium which is located some distance remote from the fisherman's casting-station. The fishingline leadward length portion is necessarily provided with appropriate fishing "Tackle" which plural term includes in addition to floats, hooks, lures, spinners, organic baits such as angleworms, nightcrawlers, crayfish, and other physiological creatures. Traditionally, fisherman have relied mainly upon natural sunlight to illuminate the fishing tackle to entice game fish theretoward. However, natural sunlight is oftentimes unreliable for illumination, there being such variables as atomspheric condition, solar position, water turbidity, and lure or bait depth within the aquatic medium. Especially vexatious for the fisherman is tackle illumination at night time, during which hours certain fish species prefer to feed.

Fishing tackle innovations of recent years include artificial illumination means for incorporation into the fishingline leadward length portion. Such prior art devices include miniature lightbilbs electrically powered by chemical storage batteries. However, not only are electric lightbulbs as artificial illuminators bulky and cumbersome, but they are not appropriate for physiological organic baits. Another recent prior art innovation includes short time-duration phosphorescent solid coatings applied to non-organic fishing tackles, but such solid coatings are not amendable for use with physiological organic baits. Organic fishing baits have been treated with non-luminescent fish-attracting means, such as internally injected air, as taught by U.S. Pat. No. 3,526,988 (Young—Sept. 8, 1970).

It is accordingly the general object of the present invention to provide a novel method and dispensing device for artificially illuminating fishing tackle and especially physiological (e.g.living) organic baits such as angleworms, nightcrawlers, crayfish, etc., Ancillary general objects include artificial illumination means having sufficient light intensity and reliability to aptly illuminate the organic fishing bait, having reliability for continuing long-term time-duration, having adaptability for various kinds of physiological organic fishing baits, and having trouble-free incorporation into numerous kinds of such baits.

With the above and other objects and advantages in view, which will become more apparent as this description proceeds, the novel method generally comprises injecting a liquid chemiluminescent light source into the internal gastro-intestinal tract of a living, or at least a physiological, organic fishing bait, the injected light source having a long-term time-duration afforded by slowly continuously inter-reacting chemical components and which suitably illuminates the bait to enhanceably attract game fish theretoward. Ancillary dispensing devices include a manually resiliently compressible container with a needle-like sharp snout for injecting the liquid chemiluminescent light source into the organic bait. Preferred dispensing devices include a segregation means, rupturable under manual pressure, to isolate the chemical first-component from the inter-reactable second-component until they are required by the fisherman for inter-reaction to commence the long-term time-duration for the bait-injectable light source.

It has been known since before 1950 that light sources might be continuously chemically generated for an extended time-duration by the slow inter-reaction between at least two apt chemical components. Such light sources are generically termed "chemiluminescent" as typified by U.S. Pat. Nos. 3,329,621(Rauhut, et al—July 4, 1967), 3,576,987(Voight, et al—May 4, 1971), and 3,597,362(Bollyky, et al—Aug. 3, 1971). These three prior art Patents (whose teachings are incorporated by reference into this patent application) described chemiluminescent light sources of improved intensity and duration as compared to those taught in 1950 by A. Bernanose in Bull.Chim.Soc.France 17,567. As typified in the 1971 Voight, et al U.S. Pat. No. 3,576,987, for practical chemiluminescent lights, the respective inter-reactable chemicals should be normally-stable, that is, have long-term shelf-life. Moreover, the chemicals need to be maintained separated from each other in mutually isolated "ready" condition until such chosen future time as they are initiatably admixed whereupon for an extended time-duration they slowly irreversibly chemically inter-act while thereby generating chemiluminescent light. The segregation means might comprise wholly separate containers for the respective inter-reactive chemical components which are later admixed within a suitable vessel. However, as typified in the 1971 Voight, et al Patent, the respective inter-reactable components might be segregated within the same compartmentalized light-transmissive container housing by a suitable breachable barrier defining the compartments, and permits segregation and then admixed inter-reaction to occur within the same housing. Thus, this too provides a chemiluminaire that is effective for an extended time-duration commencing upon initiatable breach (e.g.rupture) of the inter-compartments barrier(s). Admittedly, Voight recognizes in a very general sense that chemiluminescent light might conceiveably be employed for underwater illumination; yet, there is neither recognition nor hint that chemiluminescent light might have efficacious use in conjunction with fishing tackle and luring fish. However, as described and claimed herein, chemiluminescent light does indeed have surprising and unexpected utility for artifically illuminating fishing tackle thereby aiding the fisherman, such as for prominently displaying floats at night time, for enticing fish toward lures, baits, hooks, etc.

As indicated by the prior art teachings of Bernanose, Rauhut, Voight, and Bollyky, numerous systems of irreversibly inter-reactive chemicals might be selected for continuously generating chemiluminescent lights for fishing tackle luminaires. A preferred embodiment is that chemical light system currently marketed by the American Cyanamide Company of Bound Brook, New Jersey, under the tradename "CYALUME." However, three (I, II, III) typical systems will next be described in detail as representative possibilities for the arbitrarily selectable chemiluminescent light source element of the appended claims.

| EXAMPLE I | |
|---|---|
| First-Component | Second-Component |
| 1 mol. oxalic acid | 2 mols Tertiary butyl hydroperoxide |
| 0.002 mol anthracene | |
| 2 mols cyclohexylcarbodi-imide | 0.02 mols methane sulfonic acid |
| 1 liter diethylphthalate (diluent) | 1 liter diethylphthalate |

-continued

EXAMPLE I

| First-Component | Second-Component |
| --- | --- |
| | (diluent) |

EXAMPLE II

| First-Component | Second-Component |
| --- | --- |
| 8 mgm 4-cyanophenyloxalate | 0.4 ml. anhydrous hydrogen peroxide |
| 2 mgm 9,10-diphenyl-anthracene | 100 mgm potassium hydroxide |
| 100 mgm potassium hydroxide | 5 ml 1,2-dimethoxyethane (diluent) |
| 5 ml 1,2-dimethoxyethane (diluent) | |

EXAMPLE III

| First-Component | Second-Component |
| --- | --- |
| 10 mgm 3-aminophthal-hydrazide ("luminol") | 10 ml oxygenated water (saturated) |
| | 1 ml ethanolic potassium |

Referring now to the drawing, which depicts certain representative fishing tackle artifically illuminated with chemiluminescent light type luminaires, wherein like characters refer to like parts in the several views, and in which:

FIG. 1 is a perspective view of a fisherman stationed on a rowboat wielding typical fishing gear including a fishingline, the leadward length portion being equipped with typical fishing tackle located within an aquatic medium and in combination with initiated and glowing chemiluminescent luminaires.

FIG. 2 is a perspective view of one luminaire in the "ready non-chemiluminescent condition before being initiated and incorporated into the FIG. 1 fishingline leadward portion.

FIG. 3 is a sectional elevational view taken along line 3—3 of FIG. 2.

FIG. 3A is a detail perspective view of FIG. 1 showing the initiated luminaire of FIG. 3(phantom line condition) incorporated therewith.

FIG. 4 is a perspective view of another style luminaire in the "ready" condition.

FIG. 5 is a sectional elevational view taken along line 5—5 of FIG. 4.

FIG. 6 is a sectional plan view taken along line 6—6 of FIG. 1 showing the initiated luminaire of FIG. 5(phantom line condition).

FIG. 7 is a perspective view of a luminaire akin to that of FIG. 4 and in the "ready" condition.

FIG. 8 is a sectional elevational view taken along line 8—8 of FIG. 1 showing the FIG. 7 luminaire in initiated glowing condition.

FIG. 9 is a perspective view showing a method step herein prepatory to the condition of FIG. 10.

FIG. 10 is yet another detail view of FIG. 1.

FIG. 11 is a detail view partially in section of a method step related to that of FIG. 9.

FIG. 12 is a detail view partially in section of a method step related to that of FIGS. 9 and 11, and specifically wherein a minnow physiological creature organic bait is being injected with a chemiluminescent light source.

FIG. 13 is a sectional detail view of a method step related to that of FIGS. 9, 11 and 12.

FIG. 14 is a sectional elevational view of a dispensing device particularly adapted for the method steps of FIGS. 9, 11, 12, and 13.

FIG. 14A is a sectional elevational view of the FIG. 14 dispensing device showing the initiated chemiluminescent condition thereof.

FIG. 15 is a sectional elevational view of another dispensing device embodiment and ultimately suitable for the method steps herein.

FIG. 16 is a sectional elevational view of yet another dispensing device embodiment.

A representative use situation for the fishing tackle illumination means and method of the present invention is depicted in FIG. 1 relative to an aquatic medium (e.g. lake waters W) and a rowboat casting-station N for fisherman M holding fishing gear E. Fishing gear E includes elongate pole P, reel R which is provided with a convolutely wound supply of fishing line L and extending forwardly therefrom along pole P and thence the fishingline leadward forward portion LL extends downwardly from the pole P leading end into waters W. Herein arbitrarily selected for aquatic fishing tackle and each attached in series along the fishingline leadward portion LL are: a buoyant float or bobber F, a hook-bearing artificial hollow lure T resembling a minnow bait, and a hook-terminus H carrying a worm K below the surface of water W. An initiated glowing chemiluminescent luminaire 10G is attached to fishingline LL between lure T and hook-terminus H.

A typical chemiluminescent luminaire shown in the "ready" non-chemiluminescent condition is shown in FIGS. 2 and 3 as luminaire embodiment 10. Luminaire 10 comprises an elongate rectangularly tubular transluscent housing 11 having endwalls 13 (carrying a clip 14 for removably engaging fishing line LL) and also 12. Housing 11 has therewithin the first-component and the second-component of the chemiluminescent light source and in mutually isolated segregated condition, as by a rupturable barrier 15 located about midway between and parallel to the endwalls 12 and 13. Thus, there is herein two compartments within elongate housing 11 including a right-compartment 16 (between endwall 12 and frangible plate barrier 15) and a left-compartment 17(between endwall 13 and barrier 15). Arbitrarily selected for right-compartment 16 is the first-component of the Example I chemiluminescent chemicals system and for left-compartment 17 is the Example I second-component. Thus, the two components of Example I are mutually isolated or segregated from each other indefinitely and so long as the integrity of barrier 15 remains whereby the luminaire 10 remains "ready" and non-chemiluminescent. However, someone (e.g. fisherman M) can commenceably initiate the chemical inter-reaction between the first-component (e.g. 18, 28) and the second-component (e.g. 19, 29) which generates a chemiluminescent light source which as luminaire 10G glows steadily for an extended finite-duration through light-transmissive housing (e.g.11,21). In this vein, the person (e.g. M) initiates same from a suitable make-up station (e.g. casting-station N). For example, as indicated in phantom line in FIG. 3A, fisherman M at rowboat N manually flexes housing 11 to fracture barrier plate 15 which de-segregates compartments 16 and 17, which accordingly initiatably admixes the first-component with the second-component. Glowing luminaire 10G, herein removably incorporated (e.g. at 14) with fishingline LL, is adapted underwater and even at night time to entice fish toward the flanking lure T or to the baited hook-terminus H. The chemiluminescent light (e.g. "CYALUME") typically glows useably for an extended time-duration of at least 2 or 3 hours.

Another embodiment chemiluminescent luminaire shown in the "ready" non-chemiluminescent condition is shown in FIGS. 4 and 5 as embodiment 20. Luminaire 20 comprises an elongate circularly tubular transluscent housing 21 having an integral endwall 22 and a removable endwall 23 (as endcap 23), the respective endwalls 22 and 23 each being provided with an interior recess for seating a coaxial frangible innertube 25. The second-component (e.g. 19,29) is located within frangible barrier compartment 25 and thereby segregated from first-component (e.g. 18, 28) which is in housing 21 surrounding co-axial barrier 25. As indicated in the phantom line condition 20G in FIG. 5, the fisherman can commenceably initiate the chemical inter-reaction simply by manually bending the relatively flexible housing 21 which fractures the relatively rigid innertube 25 whereby the two components become admixed to slowly continuously chemically generate chemiluminescent light. Herein, the resultant glowing luminaire 20G is placed inside a light-transmissive dual-hemispheres type buoyant float F whereby the float is clearly discernable to the fisherman even at night time.

Luminaire embodiment 30 of FIG. 7 differs from that of embodiment 20 only in that the endcap 33 is externally threaded to permit its removable threaded engagement with some selected fishing tackle. For example, the artificial lure bait T structurally comprises transluscent resin with a hollow internal tract, there being a threaded opening TT and a depending central-hook J. Thus, after luminaire 30 is initiated into glowing chemiluminescense 30G, endcap 33 is inserted into lure T and removably threadedly engaged at TT.

The liquid continuously inter-reacting chemiluminescent light source might be pressurably injected as a method step into the internal tract of a bait, through a needle-like snout penetratin tool (e.g. 42, 102), penetration by the tubular tool being made into the bait internal tract. In FIGS. 9–11 and 12, the bait is a physiological organic bait having a gastro-intestinal internal tract. Such glowing baits (e.g. glowing living worms KG–KKG and living minnow-fish RG) have been found to be exceedingly enticing for game fish. As indicated in FIGS. 9, 11, and 12, the first-component (e.g. 18, 28) and the second-component (e.g. 19, 29) from separate external containers (not shown) might be admixed within a manually resiliently compressible syringe container housing 41 having a removable tubular sharp needle-like snout 42 which permits injection of the inter-reacting liquid chemiluminescent light source into the gastro-intestinal tract. Of course, the bait injection step can be accomplished at any makeup-station including even at casting-station N.

In FIG. 9, the tubular sharp tool 42 is penetrated sidewardly into the internal tract (KT) of a transluscent angleworm or nightcrawler K to yield glowing condition KG. In FIG. 11, the sharp tool is penetrated deeply via the worm's feeding-mouth KM into the gastro-intestinal tract KT to yield expanded and glowing condition KKG. The advantages of this oral penetration prodcedure include that the elongated worm is not likely to constrictably impede the injection of the liquid cemiluminescent light source. In FIG. 12, the liquid chemiluminescent light source is pressurably injected via the anus RA into the gastro-intestinal stomach RT of transluscent and hence glowing (RG) minnow-fish organic bait R.

An especially apt and sophisticated dispensing device employable with the methods alluded to in the two preceeding paragraphs is illustrated in FIGS. 14–14A. There is a manually resiliently compressible container housing 100 having an outletend such as a narrowed neck portion 101 which is herein provided with external helical threads. The tubular penetration snout tool takes the form herein of a sharply beveled tubular needle 102 which is surrounded by and tightly frictionally secured by the neck 101 of container 100. In order to prevent injury to the fisherman and to prevent spillage of the liquid chemiluminescent light source, there is preferably a protective cap 103 removably associated with the container 100 and surrounding the sharp tubular snout 102. Herein, protective cap 103 is threadedly engaged with container neck 101, and cap 103 includes a perforate ear 104 which can accommodate a string or lanyard to prevent loss of the cap and/or container by the fisherman.

The segregation means for the first-component 18, 28 and the second-component 19, 29 of the normally-stable chemical reactants takes the form in FIG. 14 of a rupturable frangible barrier 115 analagous in function to barrier 15 of FIGS. 2–3A. Thus, upon manual compression exerted to container housing 100 (indicated in phantom line in FIG. 14), the barrier 115 ruptures and breaks (as seen in FIG. 14A) thereby initiating the time-duration for the liquid chemiluminescent light source. The structural wall thickness for the manually compressible container housing 100,200 must be sufficient to itself withstand being ruptured by the frangible barriers 115, 118, 218, 219.

Preferably, the container housing includes a shielding means 105 surrounding the segregation means 115, the shielding means being substantially opaquely impervious to ambient actinic light thereby increasing the storage life stability for the interreactable segregated chemicals. The shielding means might simply comprise an opaque paint layer 105 for the transluscent container housing, herein for the lower portions thereof. The shielding means preferably also includes an opaque removable panel portion, such as panel 106 surrounding the upper portion of and removably adhesively attached to transluscent container housing 100. Thus, as alluded to in FIG. 14A, the transluscent light-transmissive container housing itself is functionable as a lantern to visually aid the fisherman in accomplishing the injection method steps at night time.

In FIG. 15 the segregation means is a single rupturable tube 118 surrounding the first-component only 18, 28, while in FIG. 16 the segregation means comprises two parallel rupturable tubes 218 and 219 for the first-component 18, 28 and the second-component 19, 29, respectively. Not only do the two axial parallel tubes 218 and 219 provide exceedingly easily rupturable segregation means, but they also prevent the container housing 100, 200 from being corroded by the chemicals during prolonged storage prior to fishing use. The container outlet-end in FIGS. 15 and 16, having a threadedly engaged cover 210, is amendable for the tubular snout tool embodiment 42, if deemed desireable.

From the foregoing the implementation of the method steps and the construction and operation of the dispensing device employable therefor will be readily understood and further explanation is believed to be unnecessary. However, since numerous modifications and changes will readily occur to those skilled in the art, it is not desired to limit the invention to the exact method steps and structures shown and described, and accordingly, all suitable modifications and equivalents may be resorted to, falling within the scope of the appended claims.

I claim:

1. The method for illuminating transluscent fishing bait having an internal tract so as to enhance the attraction of said illuminated bait for game fish, said method comprising the following steps in order:
   A. Initiatably desegregating normally stable inter-reactive chemical components including a first-component and a second-component to allow said chemical components to inter-react thereby initiating a liquid chemiluminescent light source having a long-term extended continuous time-duration;
   B. Penetrating a needle-like tubular snout tool deeply into the bait internal tract;
   C. Injecting the liquid inter-reacting chemiluminescent light source into the internal tract of a transluscent bait through said penetrated tubular snout;
   D. Incorporating the internally illuminated transluscent bait into the leadward portion of a fishingline as a tackle portion therefor; and
   E. Casting the leadward fishingline including the said chemiluminescent treated bait from a fisherman's casting-station to an aquatic medium remote therefrom.

2. The method of claim 1 wherein the transluscent bait is a physiological organic creature having a gastro-intestinal internal tract.

3. The method of claim 2 wherein the physiological organic bait is a worm-like living creature selected from a class consisting of angleworms and nightcrawlers and having a gastro-intestinal tract terminating as a feeding mouth; and wherein the liquid chemiluminescent light source is pressurably injected into the creature's mouth to expand and illuminate the gastro-intestinal tract.

4. The method of claim 2 wherein the organic bait is a transluscent living minnow-fish having a gastro-intestinal internal tract that terminates as an anus; and wherein the liquid chemiluminescent light source is pressurably injected into the minnow-fish anus to expand and illuminate the gastro-intestinal tract.

* * * * *